Nov. 3, 1942.                    E. DAIBER                    2,300,654
                                 PITOT TUBE
                            Filed Dec. 12, 1940
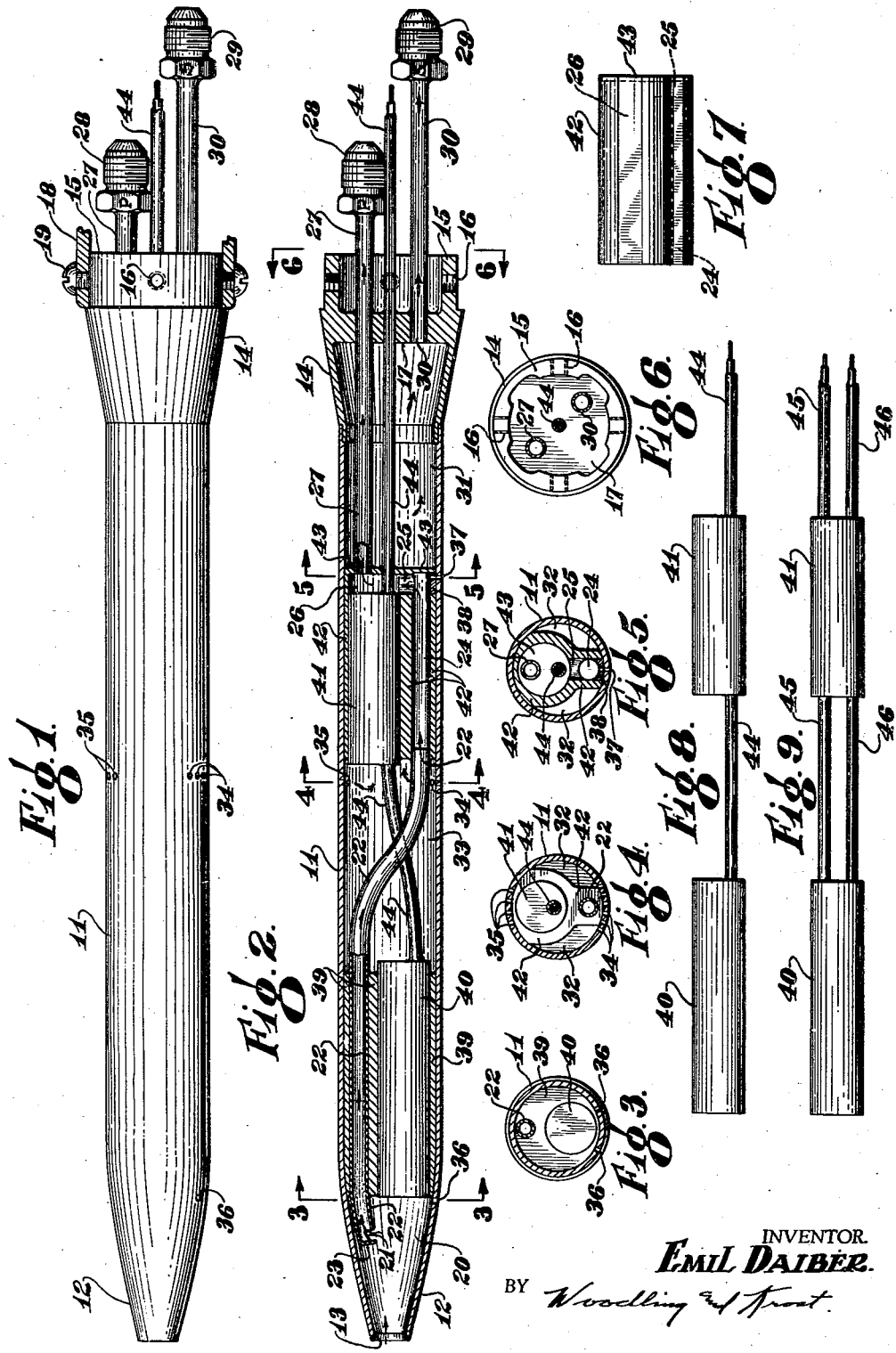
INVENTOR.
*Emil Daiber*
BY Patented Nov. 3, 1942

2,300,654

UNITED STATES PATENT OFFICE 2,300,654

PITOT TUBE

Emil Daiber, Cleveland, Ohio

Application December 12, 1940, Serial No. 369,835

9 Claims. (Cl. 73—212)

My invention relates to Pitot tubes, static tubes and Pitot-static tubes and more particularly to Pitot-static tubes utilized in apparatus mounted on aircraft, such as for indicating the speed of aircraft.

As my invention is particularly adaptable for use in Pitot-static tubes mounted upon aircraft to respond to the dynamic or impact pressure created incidental to movement of the aircraft through the air and to the static pressure of the air through which the aircraft moves, the present discussion is based upon that adaptation, although it is to be understood that my invention is not necessarily limited to that adaptation. For example, my tube and features thereof may be utilized in conjunction with instruments requiring accurate static pressure for operation as well as the airspeed indicators of the following discussion.

Pitot-static tubes are embodied in apparatus for indicating the speed of aircraft by mounting the tube upon the aircraft wing, outboard strut or other location on the craft where it will encounter undisturbed air-flow. The Pitot-static tube is connected in communication through suitable tubing or pipes with an airspeed indicator mounted on the instrument panel in the cockpit of the aircraft. The air under dynamic or impact pressure is admitted to the diaphragm pressure capsule in the air speed indicator instrument and the air under static pressure is admitted to the case of the instrument enclosing the capsule and thus opposes the dynamic pressure within the capsule. The indicator instrument is a sensitive differential pressure gauge and indicates the velocity pressure, that is, the difference between the dynamic or impact pressure and the static pressure, upon a dial calibrated in miles per hour.

The Pitot-static tube being mounted in the open air is subjected to all climatic conditions and is particularly subjected to the moisture content of the surrounding air and to the temperature of the air. The introduction of moisture, either as rain, fog, snow or vapor into the Pitot-static tube has an unfavorable effect upon the operation and success of the entire apparatus.

Moisture carried into the indicating instrument may corrode the thin diaphragm capsule and impair its efficiency and operability and, as a result, decrease or ruin the effectiveness of the instrument. In the event that moisture enters the internal passages of the Pitot-static tube, as the aircraft passes through air laden with rain, snow, fog or other form of water, then this moisture may easily clog or obstruct the passages of the tube and the system in communication therewith. Moreover, the temperature of the surrounding air through which the aircraft travels is often so low that the Pitot-static tube and its contents are below the freezing point of water. The formation of ice within the internal passages of the tube and the system in communication therewith clogs and obstructs the same with the result that the tube and system become inoperative. A Pitot-static tube which contains frozen moisture becomes worthless and fails to produce the result for which the tube is intended.

There have been some efforts to solve the problems of the introduction of moisture and the formation of ice in Pitot-static tubes prior to my invention. The results of these efforts, however, have not been satisfactory and have failed to produce a Pitot-static tube capable of assured continued operation. For example, there have been some Pitot-static tubes constructed with a coiled electrical resistance wire detachably mounted within the nose or front end of the tube for the purpose of heating the air in the nose of the tube by radiation of heat from the wire upon the furnishing of electrical energy to the wire. However, it has been found that this construction was not satisfactory for a number of reasons. The pilot or operator sometimes neglected to turn on the electrical switch on the circuit furnishing electrical energy to the resistance wire until he discovered during his flight that the airspeed indicator in the cockpit was not functioning by reason of the clogging of the Pitot-static tube with ice. Then upon turning on the switch the ice formed in the nose or front end of the tube might melt but the remainer of the tube, rearwardly of the nose or front end of the tube, would remain clogged with ice as the radiated heat from the coil of wire in the nose of the tube was limited to a local area and did not melt all of the ice in the tube. Even if the front opening of the Pitot-static tube was freed of ice the remaining portion of the tube remained inoperative. Also, the side openings and passages connecting therewith through which the air under static pressure entered the tube would remain clogged with unmelted ice although the nose or front end of the tube had been freed of ice by the heat radiated by the electrical resistance coil.

The placing of a demountable wire coil within the open space in the nose or front end of the tube also was unsatisfactory as the coil was easily broken and rendered inoperative. Because of the conditions under which the Pitot-static tubes are actually used the coil was particularly susceptible to breakage or displacement.

In such prior constructions there also was an additional defect in that there was no means provided for a proper distribution of heat to all parts of the tube where heat is necessary. The heat that was provided was wastefully dissipated rather than expended where necessary and desirable.

Some prior constructions included an arrangement of structural parts within a bulge or boss protruding from the cylindrical side of the tube for the purpose of entrapping moisture therein. These constructions, however, were such that the bulge or boss provided undesirable resistance to the airflow and disturbed the equilibrium of pressure obtainable about the surface of a symmetrical tube of regular cylindrical contour. These and other inherent defects and limitations made these tubes unsatisfactory.

Prior Pitot-static tubes of proper aero-dynamic shape or contour failed to provide means for efficiently stopping or baffling the flow of moisture therethrough. There was no appropriate entrapment of the moisture introduced into the tube and there was no means for discharging and eliminating the moisture from the tube. These and many other limitations and inherent defects in the construction of the prior Pitot-static tubes rendered them unsatisfactory in service and very often inoperative and worthless under conditions to which Pitot-static tubes are subjected in aviation.

An object of my invention is to provide an improved Pitot-static tube not possessing the limitations and inherent defects of Pitot-static tubes previously known. Another object is the provision of a Pitot-static tube capable of being operated at full efficiency under varying operating conditions.

Another object is the provision for entrapment of moisture in a Pitot-static tube. Another object is the provision for baffling the flow of moisture through a Pitot-static tube and for discharging or eliminating moisture from the Pitot-static tube.

Another object is the provision for efficiently heating the contents of a Pitot-static tube above the freezing point of water. Another object is the provision for properly distributing heat within a Pitot-static tube to prevent the formation of ice in the tube.

Another object is the provision of an improved system of air passageways in a Pitot-static tube.

Another object is the provision of an improved internal structure in a Pitot-static tube.

Another object is the provision of an improved Pitot tube construction.

And another object is the provision of an improved static tube construction.

And a still further object is the provision for maintaining a Pitot-static tube free of ice to assure its continued communication with an airspeed indicating instrument connected thereto.

Other objects and a fuller understanding of my invention may be had by referring to the following description and claims, taken in conjunction with the accompanying drawing, in which:

Figure 1 is a side elevational view of my improved Pitot-static tube;

Figure 2 is a cross-sectional view taken lengthwise of the tube shown in Figure 1;

Figure 3 is a transverse cross-sectional view taken through the tube in the direction of the arrows 3—3 of Figure 2;

Figure 4 is a transverse cross-sectional view taken through the tube in the direction of the arrows 4—4 of Figure 2;

Figure 5 is a transverse cross-sectional view taken through the tube in the direction of the arrows 5—5 of Figure 2;

Figure 6 is an end-wise view of the tube shown in Figure 2 looking in the direction of the arrows 6—6 of Figure 2;

Figure 7 is a side elevational view of the rearward heat distributing plug utilized in the Pitot-static tube shown in Figure 2;

Figure 8 is a side elevational view of the heating elements utilized in my tube when a one-wire electrical circuit is employed; and Figure 9 is a side elevational view of substitute heating elements utilized in my tube when a two-wire electrical circuit is employed.

My improved Pitot-static tube has an outer casing or tube 11 of hollow cylindrical shape as shown by the several views of the drawing. The forward end, that is the left-hand end of Figures 1 and 2, is somewhat tapered to form the tapered portion 12. As the casing 11 is preferably made of brass tubing or similar material the tapered portion 12 may be formed by spinning. At the rearward end of the tube, that is the right-hand end of the tube shown in Figures 1 and 2, an annular casting or rear-end member 14 is inter-fit and secured to the end of the casing by solder or other suitable means. The member 14 has a supporting portion 15 extended therefrom for providing a suitable support for the tube. Threaded holes 16 in the supporting portion are provided for receiving screw bolts 19 extending through registering openings in a suitable bracket 18. The bracket 18, of which only a small sectional portion is shown in Figure 1, may be mounted upon a strut or wing of the aircraft in a position to place the Pitot-static tube in an undisturbed airflow. The bracket 18 thus firmly supports the Pitot-static tube in position. The casting or end member 14 has an end wall 17 which extends across the annular opening of the member 14 and thus provides a closure for the rear-end of the Pitot-static tube.

At the nose or front end of the casing a round opening 13 is provided for affording communication between the outside of the casing and the interior of the casing. As the Pitot-static tube is axially aligned in the direction of the flight of the aircraft and as the forward end of the tube meets the air in advance of the tube under impact, the air entering the casing through the forward opening 13 is under dynamic or impact pressure during the flight of the aircraft. Therefore, in discussing the air which is introduced into the Pitot-static tube through the forward opening 13, the air is referred to as air under dynamic or impact pressure.

Two plug members or heat distributing blocks 39 and 42 are mounted within the casing 11 and firmly secured in place by solder or other suitable means. The plug members are composed of copper, brass or other suitable material of high heat conductivity. Electrical heating elements 40 and 41 are embedded in the plug members 39 and 42, respectively, in a maner that heat generated by the electrical heating elements is quickly and efficiently distributed by the plug members 39 and 42. Therefore, these plug members act as heat distributors for conducting heat to the wall of the casing, to the air passages in the Pitot-static tube and to the air and moisture introduced into the tube.

The front plug member 39 and heating element 40 is positioned at a short distance back from the extreme front end of the casing and thus forms a first chamber 20 within the casing 11. The front face or wall of the plug member 39 in which is embedded the element 40 forms a baffle wall in the path of the flow or force of the air under dynamic pressure entering through the front opening 13. A conduit 22 extends through the upper portion of the plug member 39 to provide communication therethrough. The forward end of the conduit extends into the front chamber 20 and communicates with the upper portion of the chamber 20 through an opening or intake port 21. An overhanging end portion 23 extends downwardly from the end of the conduit 22 to prevent moisture entering the opening 13 flowing directly into the port 21 and thus acts as a shield against the direct flow of moisture into the conduit 22.

The references to "upper" and "lower," portions or directions are directed to the upper and lower horizontal parts of the Pitot-static tube as disposed in Figures 1 and 2. The tube is mounted to aircraft in the horizontal position shown in Figures 1 and 2 and the references to "upper," "below," "above" and "lower" are based upon the disposition of the tube in this horizontal plane.

The heating element 40 is embedded in the lower portion of the plug member 39 and the conduit 22 extends through the upper portion of the plug member 39 and is disposed above the element 40.

By reason of the fact that air under dynamic pressure and moisture entering the front chamber 20 through the front opening 13 first meet the baffle wall formed by the front face of the plug member 39 there is provided a trap for moisture in the chamber 20. Moisture will tend to collect in the bottom of the chamber rather than going up and through the relatively small conduit 22. To discharge or eliminate any collected moisture in the chamber two small openings 36 are provided in the casing 11 at the bottom of the chamber 20. The force of the air under dynamic pressure aids in expelling the entrapped moisture out through the small openings 36.

A plurality of openings 34 and 35 are provided in the side of the casing 11 about midway between its ends, there being six openings 34 in the lower part of the casing and four openings 35 in the upper part of the casing and above the openings 34. The openings 34 and 35 extend through the wall of the casing 11 at right angles to the longitudinal axis of the Pitot-static tube. Inasmuch as the side openings 34 and 35 are at right angles to the direction of movement of the Pitot-static tube air entering these openings is under static pressure. The air in the passageways communicating with the side openings is referred to as air under static pressure.

The rear plug member 42 is positioned in the casing 11 to the rear of the side openings 34 and 35, that is toward the right hand end of the views of Figures 1 and 2. The shape and construction of the rear plug member 42 is somewhat different from that of the front plug member 39. Two horizontal bores are formed in the plug member 42 to extend from the front face of the plug member but stopping short of the rear face to leave the wall 43 as indicated in Figures 2 and 7. The heating element 41 is embedded in the plug member 42 by filling the upper and larger bore. The heating element 41, however, does not extend to the rear as far as the wall 43 and thus leaves a round chamber 26 formed within the plug member 42. The lower and smaller bore forms a horizontal chamber or passage 24 extending from the front face of the plug member to the rear wall 43. A vertical bore 25 is drilled up through the bottom of the plug member to provide communication between the horizontal passage 24 and the round chamber 26. The lower end of the vertical bore is then closed by a closure 38 soldered in place. The round chamber 26, the vertical bore 25 and the passage 24 are thereby joined together to form one chamber which, to distinguish from the front chamber 20, may be referred to as the rear chamber.

The metallic conduit 22 extending rearwardly from the first or front plug member 39 bends downwardly and connects with the passage 24 at the bottom of the front face of the rear or second plug member 42. The passage 24 merely acts as a continuation of the conduit 22 and is in effect a part of the same conduit.

It is seen from the view of Figure 2 that there is a reversal of the positions of the heating elements and the conduits in the plug members 39 and 42. In the front plug member the air passage is above the heating element and in the rear plug member the air passage is below the heating element. There is thus provided by the downwardly bent conduit 22 a communication between the upper portion of the front chamber 20 and the lower portion of the rear chamber (formed by bores 26 and 25). The rear wall 43 is a second baffle encountered by air under dynamic pressure and by any moisture which might have escaped from the first chamber through the conduit 22. The rear chamber thus further entraps moisture finding its way into the passages. At the bottom of the rear chamber and just in advance of the rear baffle wall 43 there is provided a small drain hole 37 extending through the wall of the casing 11. Moisture entrapped in the rear chamber in front of the rear baffle is discharged and eliminated through the small hole 37 outwardly of the tube.

A conduit or pipe 27 communicating with the upper portion of the rear chamber through the upper portion of the wall 43 provides an outlet conduit from the Pitot-static tube for the air under dynamic pressure. The pipe 27 extends through the end wall 17 and rearwardly from the rear end of the Pitot-static tube. A threaded nipple 28 on the end of the pipe 27 is adapted to be connected to the tubing or pipe transmitting air under dynamic pressure to the airspeed indicator. The letter P on the nipple 28 indicates that it is in communication with the Pitot tube system in which the air under dynamic or impact pressure is contained.

To provide a passageway through the Pitot-static tube for the air under static pressure entering the side openings 34 and 35, the rear plug member 42 is cut away along its lower sides to form side passageways 32. The two passageways 32 are substantially parallel to the internal passage 24 but do not communicate therewith. There is a relatively large enclosed space or chamber 33 formed within the casing 11 between the two plug members. Air under static pressure entering the openings 34 and 35 first enters this chamber 33 and thence passes rearwardly through the side passageways 32 to a large enclosed space or chamber 31 formed in the rear part of the casing between the rear plug member and the end wall 17. Air in the side passages 32 is in intimate heat exchange relationship with the plug member 42 as well as with the surrounding casing.

A conduit or pipe 30 extending through the end wall 17 provides communication therethrough with the large enclosed spaced or chamber 31. A threaded nipple 29 on the end of the pipe 30 is adapted to be connected in communication to the tubing or pipe transmitting air under static pressure to the airspeed indicator. The letter S on the nipple 29 indicates that it is in communication with the static tube system in which the air under static pressure is contained.

It is to be noted that the front and rear moisture entrapping chambers are substantially at the same horizontal level and within the straight walls of the cylindrical tube. The heating elements, baffles and other internal parts are all within the straight smooth and symmetrical confining sides of the cylindrical tube. Undisturbed air-flow around the tube is thus assured by this construction and there is no distortion of the air pressure by unsymmetrical bulges extending from the side of the tube.

As the electrical heating elements 40 and 41 are of the usual and well known type it has not been considered necessary to show the detail internal structure of the elements. In aircraft utilizing the single wire electrical circuit the elements 40 and 41 are supplied with electrical energy by means of the wire 44 connected to a source of electrical energy, the other electrical contact of the circuit being obtained by grounding to the metal body of the tube and the electrically connected metal framework of the aircraft. The wire 44 is insulated and extends from the first element 40 to the second element 41 and hence rearwardly axially of the casing and out through the end wall 17. The end of the wire 44 is connected to the electrical wiring system of the aircraft.

In aircraft utilizing the two-wire system for transmitting electrical energy, the two elements 40 and 41 are connected to the source of electrical energy by the two wires 45 and 46 shown in the modified arrangement of Figure 9. Other than the circuit arrangement, the construction of the Pitot-static tube is the same whether a one-wire or two-wire system is used.

The disposition of the electrical heating elements and the heat distributing plug members is such that heat is distributed to the wall of the casing and to its contents. As seen from the views of the drawing, the heat is distributed by means of the plug members to the locations where the heat is most required to keep the passages of the tube free of ice. Heat is directed to the locations of the front chamber and of the rear chamber in which moisture may be entrapped. The passages containing the air under dynamic pressure and the air under static pressure are in heat exchange relationship with the elements and the plug members. The heat is efficiently utilized and expended to maintain the contents of the tube at a sufficiently high temperature that the passages in the tube are kept free of ice and its continued operation assured. The elimination of moisture from the tube is always assured by keeping the moisture above the freezing point, by the entrapment of the moisture in advance of the two baffles and by the discharge of the moisture through the drain holes extending through the casing from the bottom of the two chambers wherein the moisture is trapped.

The preferred manner of assembling my Pitot-static tube is by first assembling the plug members, heating elements and conduits and joining them together in the arrangement of the internal parts shown in Figure 2. Prior to the assembling of the casting or annular member 14 to the casing 11 the member 14 is slipped over the two pipes 27 and 30 (the nipples 28 and 29 not then being connected to the ends of the pipes) and over the wire 44. The openings in the end wall 17 through which the pipes and wire extend are sealed by solder and the pipes and wire secured thereby to the member 14. The assembled internal parts are then moved into the casing 11 through the open rear end thereof and take the position illustrated in Figure 2. The inter-fit portions of the casing 11 and member 14 are secured together by solder or other suitable means. The front plug member 39 is firmly secured in place to the casing 11 and a hermetic seal is provided at the front baffle wall in the chamber 20 by placing solder, through the front opening 13, around the annular extent of the front face of the plug member 39. In this way the internal parts are held against rotation or other movement relative to the casing and also the front chamber 20 is hermetically sealed from the remainder of the Pitot-static tube, the only outlet from the chamber 20 rearwardly through the tube being the opening 21 into the conduit 22. The nipples 28 and 29 are then soldered or otherwise secured to the ends of the pipes 27 and 30.

In the description and claims reference is sometimes made to the passing, the entering, or the flowing of air through the several conduits or passages. This language is used in a broad sense for the purpose of making the interrelationship of the parts more apparent and clear. It is understood, however, that under stable conditions when the conduits or passages are full of air and the operating conditions remain the same, there is little or no movement or actual flow of air through the conduits or passages as the tubing or pipes connected to the nipples 28 and 29 terminate in closed chambers in the airspeed indicator. The several arrows shown in the passages or conduits indicate the relative movement or direction of force of the air under dynamic pressure and under static pressure.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. In a Pitot-static tube, a tube having an opening in its forward end for receiving air under dynamic pressure and having an opening in its side for receiving air under static pressure, a pair of electrical heating elements positioned in said tube, a pair of plug members embracing said heating elements, respectively, and engaging the inner walls of said tube, a first of said plug members having a conduit therein extending above a first of said heating elements and a second of said plug members having a conduit therein extending below the second of said heating elements, interconnecting conduit means connecting said conduits in communication, first chamber means in said tube in advance of the first heating element and second chamber means in said tube rearwardly of said second heating element for the collection of moisture entering said tube, there being discharge ports for discharging moisture collected in said chambers outwardly of the tube, a first pipe carried by the tube and in communication with the upper portion of said second chamber and adapted to communicate with an airspeed indicator, and a second pipe carried by the tube and in communication through the tube with said opening in the side of the tube and adapted to communicate with said airspeed indicator, said tube being heated by said heating elements to maintain the moisture in the air in the tube at above freezing temperature.

2. In a Pitot-static device, a tube having a first inlet at its forward end for receiving air under dynamic pressure and a second inlet in its side for receiving air under static pressure, a first heater positioned in said tube rearwardly of said first inlet and having a passageway therethrough for the air received from the first inlet, a second heater positioned in said tube rearwardly of said second inlet and having a first passageway therethrough for the air received from the first inlet and also a second passageway therethrough for the air received from the second inlet, conduit means extending from the passageway through the first heater to the said first passageway through the second heater for conducting the air under dynamic pressure through the tube, conduit means extending from the said passageways through the second heater for conducting air under dynamic pressure and air under static pressure through the tube, and electrical means for heating said heaters, said heaters heating the air contained in the tube rearwardly of said inlets to prevent freezing of moisture in said air.

3. A Pitot tube comprising a longitudinal hollow casing, said casing having an open forward end, a first plug member positioned in the casing rearwardly of the forward end to form a chamber for initially receiving the air entering said open forward end under dynamic pressure, a second plug member positioned in the casing rearwardly of said first plug member, said second plug member having a second chamber formed therein, conduit means extending longitudinally through said plug members and connecting the upper portion of the first chamber to the lower portion of the second chamber and extending from the upper portion of the second chamber rearwardly in said tube, electrical heating elements embedded in said plug members for heating air in said chambers and in said conduit means to prevent freezing of moisture in said air.

4. A Pitot-static tube comprising a longitudinal hollow casing having substantially straight side walls, said casing having an open forward end for receiving air under dynamic pressure and having an opening in its side at a distance from said forward end for receiving air under static pressure, a first plug member positioned in the casing rearwardly of the forward end to form a chamber for initially receiving the air entering said forward end, a second plug member positioned in the casing rearwardly of, and in axial alignment with, said first plug member and rearwardly of said side opening, said second plug member having a second chamber therein, communicating means connecting said chambers, said second plug member having a passageway extending therealong and communicating with said side opening, first and second heating means in said casing and positioned within said first and second plug members, respectively, for maintaining the air in said chambers, communicating means and passageway at above freezing temperature to prevent the freezing of moisture therein, and connecting means carried by the casing and communicating with said second chamber and with said passageway and adapted to communicate with an airspeed indicator.

5. In a Pitot tube, a straight tube, a pair of spaced baffle walls disposed transversely of, and positioned in, said tube athwart the flow of air therethrough from the forward end of the tube, said tube having a first chamber in advance of the first baffle wall and a second chamber in advance of the second baffle wall for collecting moisture entering said tube, said chambers being axially aligned with said tube, discharge port means for discharging collected moisture from the bottom of said chambers through the bottom of said tube, conduit means providing communication between the upper portion of the first chamber and the bottom portion of the second chamber, connecting means in communication with the upper portion of the said second chamber and adapted to communicate with an airspeed indicator, and electrical heating means, disposed adjacent, and in thermal connection with, said baffle walls and said tube to prevent the freezing of the moisture in said chambers, said baffle walls, chambers, discharge port means, conduit means and electrical heating means being disposed along a substantially straight course defined by said tube.

6. A Pitot tube comprising a longitudinal hollow casing having substantially straight sides, said casing having an open forward end, a first plug member positioned in the casing rearwardly of the forward end to form a chamber for initially receiving the air entering said open forward end under dynamic pressure, a second plug member positioned in the casing rearwardly of, and in axial alignment with, said first plug member, said second plug member having a second chamber formed therein, conduit means extending longitudinally through said plug members and connecting the upper portion of the first chamber to the lower portion of the second chamber and extending from the upper portion of the second chamber rearwardly in said tube, and electrical heating elements embedded in said plug members for heating air in said chambers and in said conduit means to prevent freezing of moisture in said air, said plug members, conduit means and heating elements being disposed along substantially a straight course defined by the straight sides of said casing.

7. In a Pitot-static tube having a substantially straight casing and having a first conduit in said casing for conducting air under dynamic pressure from the forward end to the rearward end of the casing and having a second conduit in said casing for conducting air under static pressure from a side opening in the casing to the rearward end of the casing, said conduits being adapted to communicate with an air speed indicator, spaced baffle means positioned in said first conduit for entrapping moisture carried by said air under dynamic pressure in said first conduit, a first of said baffle means being mounted in the forward portion of said casing and a second of said baffle means being mounted in the rearward portion of said casing, heating means positioned adjacent to each of said baffle means for maintaining moisture in said first conduit above the freezing point, the heating means adjacent the most rearward of said baffle means being also adjacent the said second conduit and rearwardly of said side opening to maintain the air under static pressure entering said second conduit through the side opening at above the freezing point, and discharge means for discharging entrapped moisture in said first conduit outwardly through the bottom of said casing in advance of each of said baffle means, said baffle means, heating means and discharge means being confined within the straight sides of said casing unaffected by air flow along the outside of the forward and rearward portions of the casing.

8. In a Pitot-static tube having a substantially straight casing and having a first conduit in said casing for conducting air under dynamic pressure from the forward end to the rearward end of the casing and having a second conduit in said casing for conducting air under static pressure from a side opening in the casing to the rearward end of the casing, said conduits being adapted to communicate with an air speed indicator, spaced baffle means positioned in said first conduit for entrapping moisture carried by said air under dynamic pressure in said first conduit, a first of said baffle means being mounted in the forward portion of said casing and a second of said baffle means being mounted in the rearward portion of said casing, heating means positioned adjacent to each of said baffle means for maintaining moisture in said first conduit above the freezing point, and discharge means for discharging entrapped moisture in said first conduit outwardly through the bottom of said casing in advance of each of said baffle means, said baffle means, heating means and discharge means being confined within the straight sides of said casing unaffected by airflow along the outside of the forward and rearward portions of the casing.

9. In a Pitot tube having a straight cylindrical casing adapted to be positioned in an undisturbed air flow and having a conduit extended through the casing for conducting air under dynamic pressure from the forward end to the rearward end of said casing, said conduit being adapted to communicate with an air speed indicator, spaced baffle means positioned in said conduit for entrapping moisture carried by said air under dynamic pressure in said conduit, a first of said baffle means being mounted in the forward portion of said casing and a second of said baffle means being mounted in the rearward portion of said casing, heating means positioned adjacent to each of said spaced baffle means for maintaining moisture in said conduit above the freezing point, and discharge means for discharging entrapped moisture in said conduit outwardly through the bottom of said casing in advance of each of said baffle means, said baffle means, heating means and discharge means being confined within the straight sides of the cylindrical casing unaffected by airflow along the outside of the forward and rearward portions of the cylindrical casing.

EMIL DAIBER.